United States Patent
Whittaker

(10) Patent No.: US 10,382,328 B1
(45) Date of Patent: Aug. 13, 2019

(54) BOUNCING ROUTER COMMUNICATIONS IN A MULTI-TIER NETWORK

(71) Applicant: Amazon Technologies, Inc., Seattle, WA (US)

(72) Inventor: Colin John Whittaker, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 90 days.

(21) Appl. No.: 15/279,216

(22) Filed: Sep. 28, 2016

Related U.S. Application Data

(60) Provisional application No. 62/368,881, filed on Jul. 29, 2016.

(51) Int. Cl.
*H04L 12/707* (2013.01)
*H04L 12/741* (2013.01)
*H04L 12/755* (2013.01)
*H04L 12/775* (2013.01)
*H04L 12/935* (2013.01)

(52) U.S. Cl.
CPC .......... *H04L 45/583* (2013.01); *H04L 45/021* (2013.01); *H04L 45/24* (2013.01); *H04L 45/54* (2013.01); *H04L 45/745* (2013.01); *H04L 49/3009* (2013.01)

(58) Field of Classification Search
None
See application file for complete search history.

(56) References Cited

U.S. PATENT DOCUMENTS

| | | | |
|---|---|---|---|
| 9,172,599 B1 * | 10/2015 | Scholl | H04L 41/0654 |
| 9,363,208 B1 * | 6/2016 | Judge | H04L 49/15 |
| 2014/0258479 A1 * | 9/2014 | Tenginakai | H04L 41/082 709/220 |
| 2015/0381484 A1 * | 12/2015 | Hira | H04L 45/64 370/390 |
| 2017/0063633 A1 * | 3/2017 | Goliya | H04L 41/12 |
| 2017/0126497 A1 * | 5/2017 | Dubey | G06F 9/45558 |
| 2017/0359261 A1 * | 12/2017 | Avci | H04L 47/125 |

* cited by examiner

*Primary Examiner* — Chirag G Shah
*Assistant Examiner* — Srinivasa R Reddivalam
(74) *Attorney, Agent, or Firm* — Klarquist Sparkman, LLP

(57) ABSTRACT

Technologies are provided for distributing intra-network communications evenly across routers in a multi-tier network. Routers in a middle tier of the network receive data transmissions from a router in a lower tier of the network and determine that a destination of the data transmissions is another router in the lower tier of the network. Instead of routing the data transmissions to the destination router directly, the routers in the middle tier of the network route the data transmissions to other routers in a higher tier of the network. The routers in the higher tier of the network then route the data transmissions back to routers in the middle tier of the network, distributing the data transmissions evenly across routers in the middle tier that are connected to the destination router in the lower tier.

17 Claims, 12 Drawing Sheets

```
        # match default
502 ~  prefix clone 0.0.0.0/0
        # match any /8 sub default
504 ~  prefix clone 0.0.0.0/0 eq 8
        # match 100.64/10 sub-default
506 ~  prefix clone 100.64.0.0/10
        #
        # enable rack facing interfaces for bounce operation
508 ~  interface enable port25
        ...
510 ~  interface enable port48
```

```
602    prefix filter 10.1.96.0/19
604    prefix filter 10.40.0.0/18
606    prefix filter 10.40.248.0/21
608    prefix filter 10.32.0.0/17
610    prefix filter 10.32.128.0/17
612    prefix filter 11.0.32.0/20
614    prefix filter 11.0.48.0/20
       #
       # enable rack facing interfaces for bounce operation
616    interface enable port25
       ...
618    interface enable port48
```

US 10,382,328 B1

BOUNCING ROUTER COMMUNICATIONS IN A MULTI-TIER NETWORK

CROSS REFERENCE TO RELATED APPLICATION

This application claims the benefit of U.S. Provisional Application Ser. No. 62/368,881, entitled BOUNCING ROUTER COMMUNICATIONS IN A MULTI-TIER NETWORK, filed on Jul. 29, 2016, which is incorporated by reference herein in its entirety.

BACKGROUND

Data centers can use multi-tier network fabrics that are made up of multiple routers and that support uplinks from a lower level of routers, such as multiple top-of-rack (TOR) routers. Due to the intra-network routing protocols (such as open shortest path first (OSPF)) used within a multi-tier network, in some scenarios different data packets transmitted from one lower level router to another lower level router can take different routes through the network. In at least some cases, this can lead to an unbalanced utilization of network resources.

Therefore, there exists ample opportunity for improvement in technologies related to routing data communications in a multi-tier network.

BRIEF DESCRIPTION OF THE DRAWINGS

FIG. 5 is a diagram depicting an example configuration for routing communications between top-of-rack (TOR) routers through T2 routers.

DETAILED DESCRIPTION

Due to the intra-network routing protocols (such as open shortest path first (OSPF)) used within a network fabric (e.g., within a rack aggregation device), in some scenarios different data packets transmitted from one router to another router in a same tier of the network can take different routes through the network. For example, in a network comprising multiple tiers of routers, some data packets may be routed with only one hop by a middle tier router connected to both a source router in a lower tier and a destination router in the lower tier, while other data packets, that are transmitted by the source router to a middle tier router that is not connected directly to the destination router, may be routed through one or more routers in an upper tier of the network in order to reach the destination router.

This behavior can negatively impact network performance in some cases. For example, there can be different latencies for portions of a data transmission that take different routes through the network. This can cause a large number of data packets in the transmission to be received out of order, which can cause extra work for the receiving server to re-assemble the data transmission. Additionally or alternatively, in a scenario where a destination router partially overlaps with a source router, there is a possibility that full bisectional bandwidth will not be delivered because congestion will occur on the links from the overlapping middle-tier routers.

Figure 1:
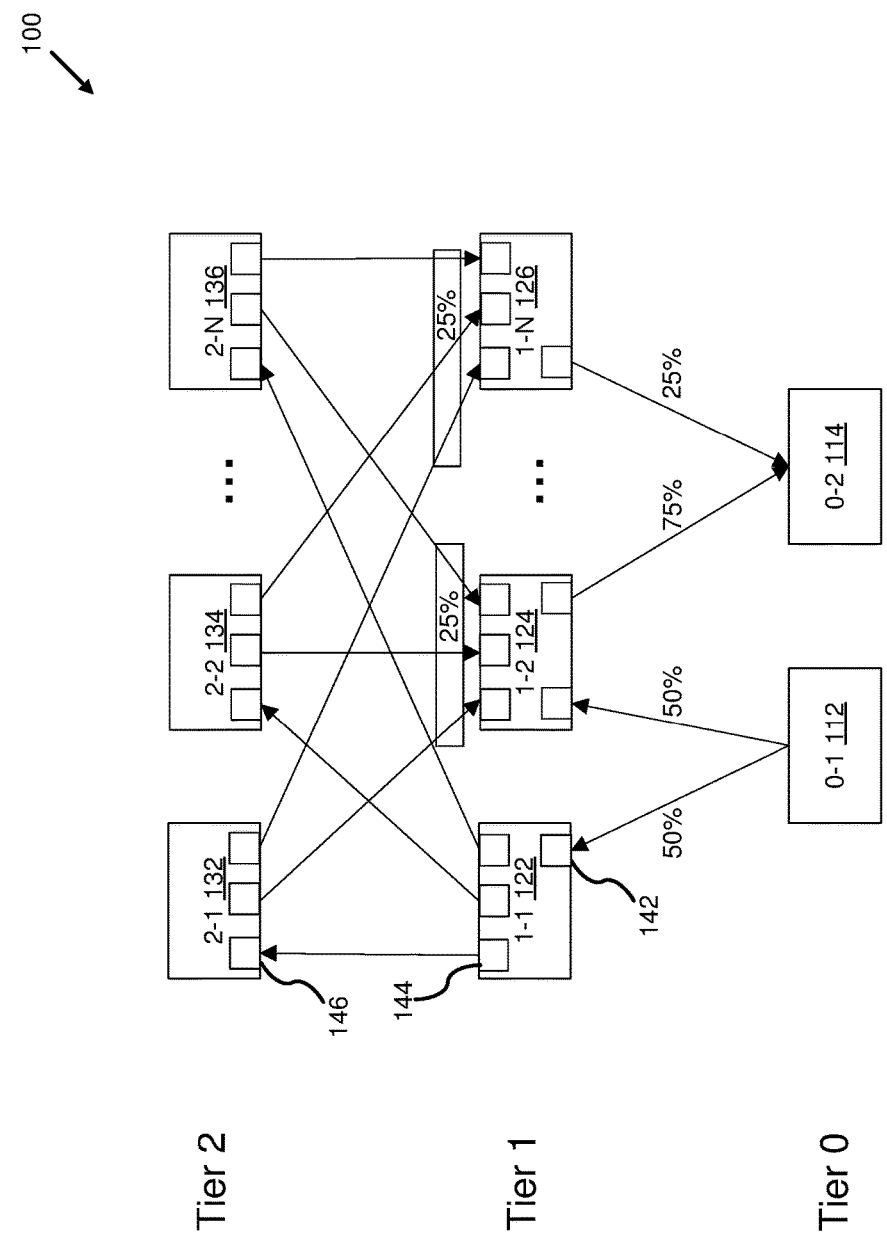
FIG. 1 is a system diagram showing an example system configured to transmit data communications between routers in a lower network tier via routers organized in two higher network tiers.

FIG. 1 is a system diagram depicting an example system 100 comprising N Tier 2 (T2) routers 132-136 connected to N Tier 1 (T1) routers 122-126 by a uniform mesh and two Tier 0 (T0) routers 112 and 114 connected to the T1 routers in a partially overlapping configuration. For example, the T0 router 112 is connected to the T1 router 122 and the T1 router 124, while the T0 router 114 is connected to the T1 router 124 and the T1 router 126. The T0 routers 112 and 114 have partially overlapping connections because they are both connected to T1 router 124 but are each also connected to different T1 routers. The T0 routers 112 and 114 are connected to downlink interfaces (e.g., 142) of the T1 routers 122-126. Uplink interfaces (e.g., 144) of the T1 routers 122-126 are connected to downlink interfaces (e.g., 146) of the T2 routers 132-136.

Two T0 routers (112 and 114), with two connections each, are depicted for illustration purposes. Other numbers of T0 routers and/or other numbers of connections are also possible. Usually, there is also no requirement that the T0 routers have the same number of connections. In at least some embodiments, the T0 routers 112 and 114 can be top-of-rack (TOR) routers and the T1 router downlink interfaces (e.g., 142) can be rack-facing interfaces.

In any of the example multi-tier networks described herein, the tiers can be described as "lower" and "higher" (or "upper") tiers. For example, a Tier 0 could be described as a lower tier, and Tier 1 and Tier 2 could be described as higher tiers, relative to Tier 0. A lower tier can be a tier of routers that are relatively closer to server racks containing source and/or destination servers in a multi-tier network, while a higher tier can be a tier of routers that are relatively farther away from the server racks. In this sense, the terms closer and farther away can refer to a number of intervening routers between a router and the server racks, rather than geographic distance. In at least some embodiments, a Tier 0 router (such as the T0 routers 112 and 114 depicted in FIG. 1) can be a TOR router connected to a server rack. For example, T0 routers 112 and 114 can be TOR routers connected to separate server racks.

The T0 router 112 is depicted as transmitting a data communication to the T0 router 114 via the T1 routers 122-126 and the T2 routers 132-136. The T0 router 112 transmits 50% of the data communication to the T1 router 122 and the other 50% of the data communication to the T1 router 124. For example, the data communication can comprise multiple data packets and 50% of the data packets can be transmitted to the T1 router 122, and the other 50% of the data packets can be transmitted to the T1 router 124.

The T1 router 122 transmits the data it receives to the T2 routers 132-136. The T1 router 122 is configured to spread the data across the T2 routers 132-136. The T2 routers 132-136 then transmit half of the data they received (i.e., 25% of the total data communication) to the T1 router 124 and the other half of the data they received to the T1 router 126.

The T1 router 124 detects that the T0 router 114 is connected to a rack-facing interface of the T1 router 124 and transmits the 50% of the data communication it received from the T0 router 112 directly to the T0 router 114, along with the 25% of the data communication it received from the T2 routers 132-136. The T1 router 126 transmits the 25% of the data communication it received from the T2 routers 132-136 to the T0 router 114.

Since the T1 router 124 transmits the 50% of the data communication it received from the T0 router 112 directly to the T0 router 114, as well as the 25% of the data communication it received from the T2 routers 132-136, the T1 router 124 transmits 75% of the data communication to the T0 router 114. The T1 router 126 transmits the remaining 25% of the data communication to the T0 router 114. Thus, in this scenario, the data communication to the T0 router 114 is disproportionally distributed across the T1 routers 124 and 126.

At least some of the technologies described herein can be used to evenly, or more evenly, distribute inter-router data communications across the routers in higher tiers of a multi-tier network fabric (such as a Clos network). In scenarios where data traffic could be sent immediately to a destination router in a lower tier of the network, the data traffic can instead be transmitted up to one or more routers in a higher tier in the network in order to have an opportunity to re-balance the traffic-load across the routers in the network. For example, by routing inter-T0 router data transmissions from T1 routers up to T2 routers, even where a T1 router has a direct connection to a destination T0 router, the data transmissions can be evenly distributed across all T1 routers connected to the destination T0 router. Since the data transmission is routed up to the T2 routers by T1 routers, and then routed back down to T1 routers by the T2 routers, this routing technique is sometimes referred to herein as "T2 bounce." However, depending on the number of tiers in a given multi-tier network, traffic can be routed to other tiers (e.g., Tier 3, Tier 4, when such tiers exist in a given fabric) to provide a "bounce."

Figure 2A:
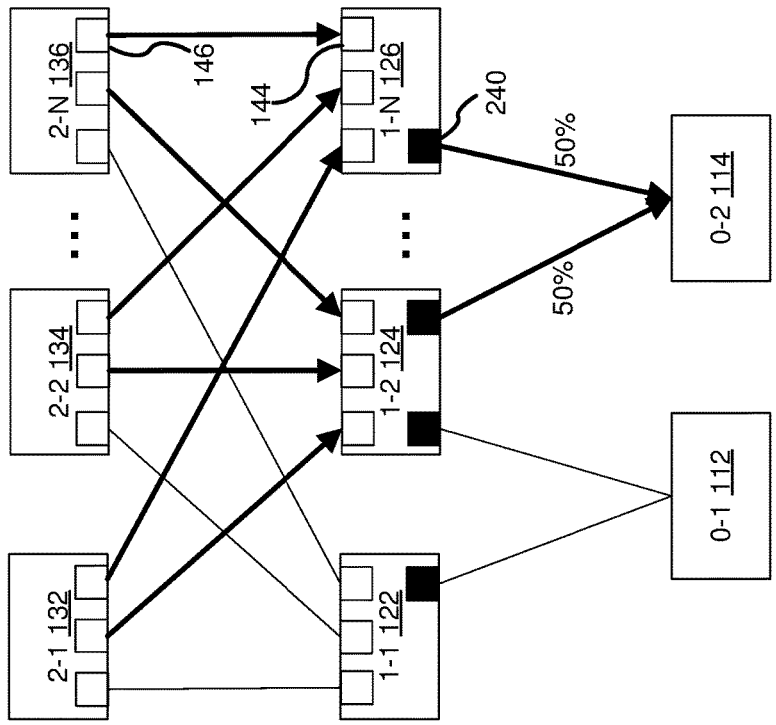
FIGS. 2A and 2B are system diagrams showing an example system comprising routers in a tier of a network configured to route data communications between routers in a lower tier of the network through routers in a higher tier of the network.

FIG. 2A is a system diagram depicting an example system 200 configured to route data communications between T0 routers through T2 routers. Downlink interfaces (e.g., 240) of the T1 routers 122-126, which are directly connected to the T0 routers 112, 114, are depicted as solid black boxes, and other interfaces (e.g., 144 and 146) are depicted as solid white boxes. The T1 routers 122-126 are configured to monitor data packets received over their respective downlink interfaces (e.g., 240). If a data packet received over a monitored downlink interface (i.e., a packet received from a T0 router) is destined for another T0 router, then the data packet is routed up to a T2 router and any potential direct connection to the destination T0 router is ignored. For example, the T1 router 124 is depicted as receiving 50% of a data transmission from the T0 router 112 that is destined for the T0 router 114 and routing the received 50% of the data transmission up to the T2 routers 132-136. The T1 router 122 is also depicted as receiving 50% of the data transmission from the T0 router 112 and routing the received 50% of the data transmission up to the T2 routers 132-136. As a result, all of the data transmission from the T0 router 112 can be distributed evenly across the T2 routers 132-136 (i.e., one third of the data transmission to each of T2 routers 132-136).

Figure 2B:
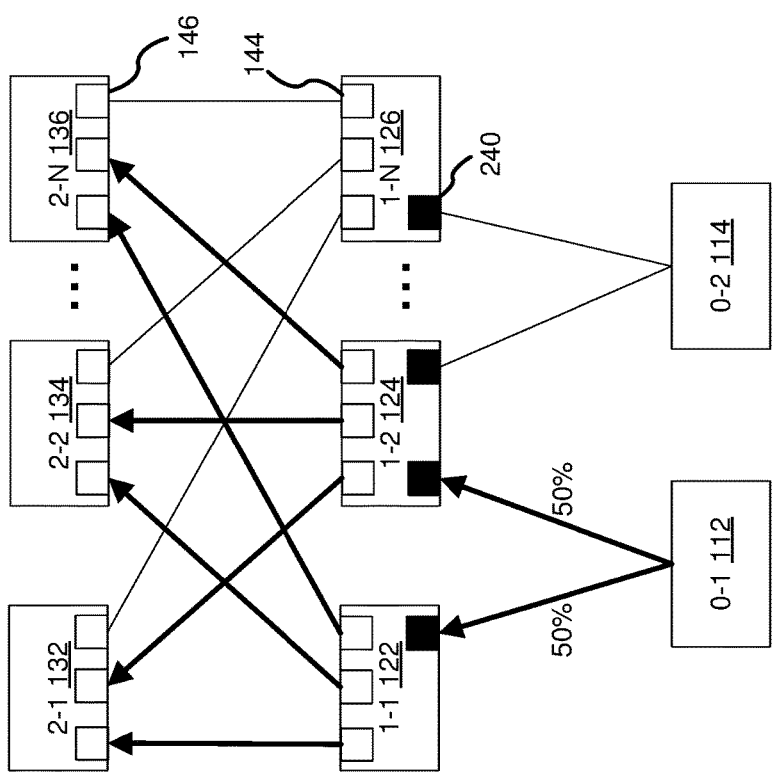

FIG. 2B is a system diagram of the example system 200 depicting the T2 routers 132-136 transmitting the data transmission received from the T1 routers 122 and 124 to the T0 router 114 via the T1 routers 124 and 126. The T2 routers 132-136 can detect that the destination T0 router 114 is connected to the T1 routers 124 and 126, and distribute the respective portions of the data transmission they received from the T1 routers 122 and 124 evenly across the T1 routers 124 and 126. For example, the T1 router 124 is depicted as receiving 50% of the data transmission from the T2 routers 132-136 and transmitting the received 50% of the data transmission to the T0 router 114. The T1 router 126 is also depicted as receiving 50% of the data transmission from the T2 routers 132-136 and transmitting the received 50% of the data transmission to the T0 router 114. The packets of the data transmission are received across unmonitored interfaces (e.g., 144), so the T1 routers 124 and 126 route the data packets to the destination T0 router 114 instead of re-routing the data packets back up to the T2 routers 132-136.

In at least one embodiment, the T0 routers 112 and 114 can be TOR routers and the downlink interfaces (e.g., 142) of the T1 routers 122-126 can be rack-facing interfaces.

In at least some embodiments, one or more of the routers can be replaced with switches having at least some of the same functionality as the routers.

Figure 3:
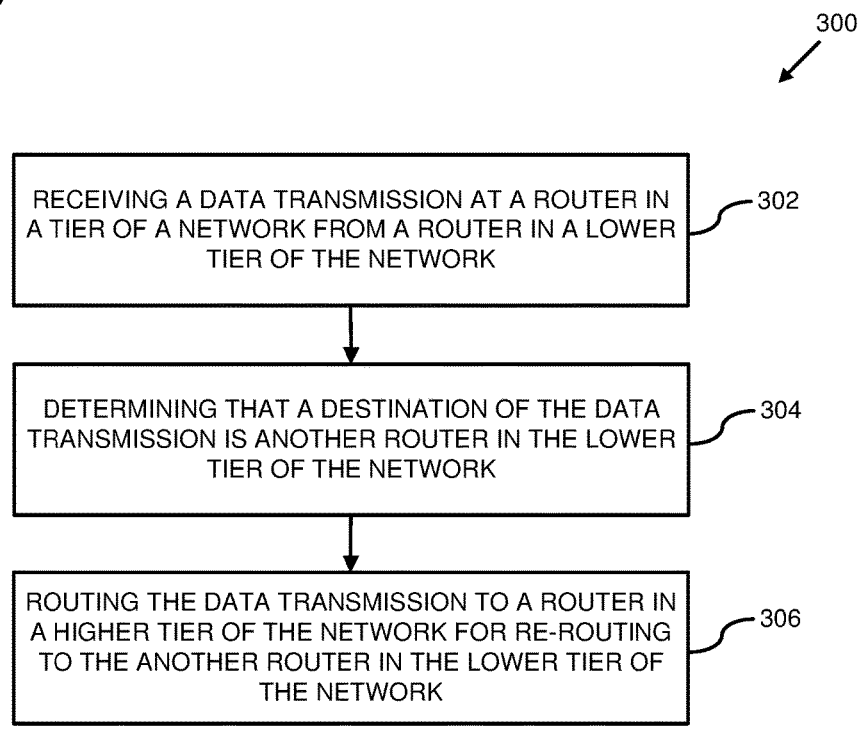
FIG. 3 is a flowchart of an example method for routing a data transmission from one router in a lower tier of a network to another router in the lower tier of the network through a router in a higher tier of the network.

FIG. 3 is a flowchart of an example method 300 for routing a data transmission from one router in a lower tier of a multi-tier network to another router in the lower tier of the network through a router in a higher tier of the network. At 302, a data transmission is received at a router in an intermediate tier in the network from a first router in a lower tier of the network and that is directly connected to the router in the intermediate tier of the network.

At 304, it is determined that a destination of the data transmission is a second router in the lower tier of the network that is connected directly to the router in the intermediate tier of the network. Described more generally, it is determined that the destination of the data transmission is a router that is in the same tier of the network fabric as the first router. In at least one embodiment, the data transmission can comprise one or more IP packets. In such an embodiment, a destination IP address in a Destination IP Address field of one of the IP packets can be analyzed to determine whether the destination IP address is associated with a router in the lower tier of the network. The determination that the destination IP address is associated with a router in the lower tier of the network can comprise comparing the destination IP address to one or more subnet masks associated with one or more routers in the lower tier of the network.

At 306, responsive to the determining that the destination of the data transmission is a second router in the lower tier of the network connected to the router in the intermediate tier of the network, instead of routing the data transmission directly to the second router in the lower tier of the network, the router in the intermediate tier of the network routes the data transmission to one or more routers in a higher tier of the network for re-routing to the second router in the lower tier of the network.

In a further embodiment, the router in the intermediate tier of the network can re-receive at least part of the data transmission from the one or more routers in the higher tier of the network and route the at least part of the data transmission to the second router in the lower tier of the network.

In at least one embodiment, routing the data transmission to the one or more routers in the higher tier of the network can be based on a routing table stored in the router in the intermediate tier of the network for use in routing data transmissions destined for routers in the lower tier of the network that is separate from a default or global routing table that is also stored in the router. For example, an alternative routing table can be constructed in the router and selectively applied to certain interfaces of the router. The alternative routing table can be used to selectively route some types of traffic to the one or more routers in the higher tier of the network while the default routing table can be used to route other types of traffic from the applied interfaces, and all traffic received over other interfaces of the router. When applied to an interface of the router, the alternative routing table can cause the router to route packets, which are destined for a router in the lower tier of the network, to one or more routers in a higher tier of the network. The alternative routing table can be applied to one or more interfaces of the router that are connected directly to routers in the lower tier of the network.

A routing table stores information about connections between routers in a network. The routing table can be used by a router to determine routes for transmitting data messages in the network. In at least some embodiments, a routing table can be referred to as a network topology or a lookup table.

In a scenario where the alternative routing table is applied to all interfaces connected to routers in a lower tier of the network for all routers in a multi-tier network, the effect can be to push all traffic transmitted by routers in the lower tier of the network, that is destined for other routers in the lower tier of the network, up to routers in a higher tier of the network. In such a scenario, intra-network traffic (i.e., communications between routers connected to the network) can be balanced across all routers in the network. In a different or further embodiment, the alternative routing table can be used to route traffic destined for a destination that is local to the network (such as a router in the lower tier of the network) and the default or global routing table can be used to route traffic destined for destinations that are not local to the network (such as a destination outside of the network).

Figure 4:
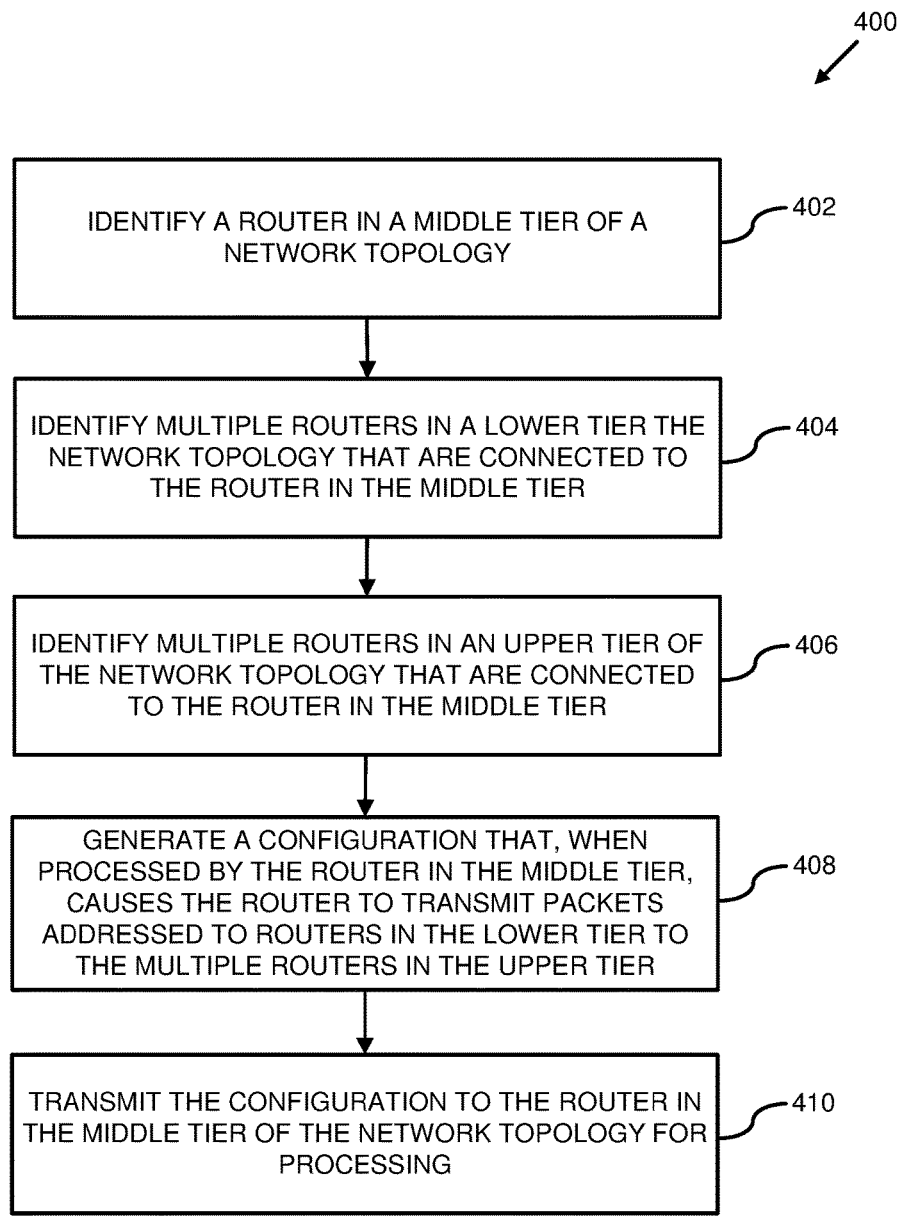
FIG. 4 is a flowchart of an example method for generating a configuration for causing a router in a middle tier of a network to route packets received from routers in a lower tier of the network, and addressed to other routers in the lower tier of the network, through routers in a higher tier of the network.

In at least some embodiments, a configuration that will configure a router in a middle tier of a network to perform "T2 bounce" routing can be dynamically generated based on a topology of a network. FIG. 4 is a flowchart of an example method 400 for generating a configuration for causing a router in a middle tier of a network to route packets received from routers in a lower tier of the network, that are destined for other routers in the lower tier of the network, through routers in a higher tier of the network.

At 402, a router is identified in a middle tier of a network topology. The network topology can comprise metadata describing nodes in the network and connections between the nodes. The metadata can describe a type of each node (such as an upper tier router, a middle tier router, a lower tier router, etc.). The metadata can be analyzed to identify a middle tier router in the network topology. At 404, once the middle tier router has been identified, multiple lower tier routers connected to the middle tier router can be identified using the metadata in the network topology. For example, using the network topology, it can be determined that a given node is a middle tier router and that multiple other nodes connected to the middle tier router are lower tier routers. At 406, using the topology, it can be determined that multiple other nodes connected to the middle tier router are upper tier routers.

Based on this information, at 408 a configuration is generated that, when processed by the middle tier router, causes the middle tier router to transmit packets received from one of the connected lower tier routers, that are destined for one or more other connected lower tier routers, up to one or more of the connected upper tier routers.

The configuration can be generated by a configuration generation system with access to the network topology and configured to analyze the network topology. The configuration generation system can, for example, identify one or more subnet masks associated with the lower tier routers connected to the middle tier router, and create a configuration that specifies that data packets received from interfaces connected to the lower tier routers with destination addresses that match one or more of the identified subnet masks should be routed to one or more of the connected upper tier routers.

At 410, the generated configuration is transmitted to the middle tier router for processing. The configuration, when processed by the middle tier router, can cause the middle tier router to create an alternative routing table and apply the alternative routing table to the interfaces of the middle tier router connected to the lower tier routers.

The example method 400 can be performed for multiple middle tier routers identified in the network topology in order to create a configuration for each identified middle tier router. No special configuration is required for the upper tier routers.

FIG. 5 depicts an example configuration 500 for creating an alternative routing table for a T1 router and applying the alternative routing table to one or more interfaces of the T1 router. Prefix clone lines 502-506 of example configuration 500 identify address prefixes whose routes should be copied from a default routing table to the alternative routing table. Interface lines 508-510 specify the interfaces (e.g. port25-port48) of the T1 router to which the alternative routing table should be applied. When the example configuration 500 is processed by the T1 router, an alternative routing table will be created comprising the routes specified by the lines 502-506 and the alternative routing table will be applied to the interfaces port25-port48 of the T1 router.

Figure 6:
FIG. 6 is a diagram depicting another example configuration for routing communications between TOR routers through T2 routers.

FIG. 6 depicts another example configuration 600 for creating an alternative routing table for a T1 router and applying the alternative routing table to one or more interfaces of the T1 router. Prefix filter lines 602-614 specify example prefixes for a local address space for TOR routers connected to the network. Interface lines 616-618 specify interfaces (e.g. port25-port48) of the T1 router to which the alternative routing table should be applied. When the example configuration 600 is processed by the T1 router, an alternative routing table will be created that will route data transmissions destined for addresses within the address space specified by the prefix filter lines 602-614 up to T2 routers connected to the T1 router and the alternative routing table will be applied to the interfaces port25-port48 of the T1 router.

Figure 7A:
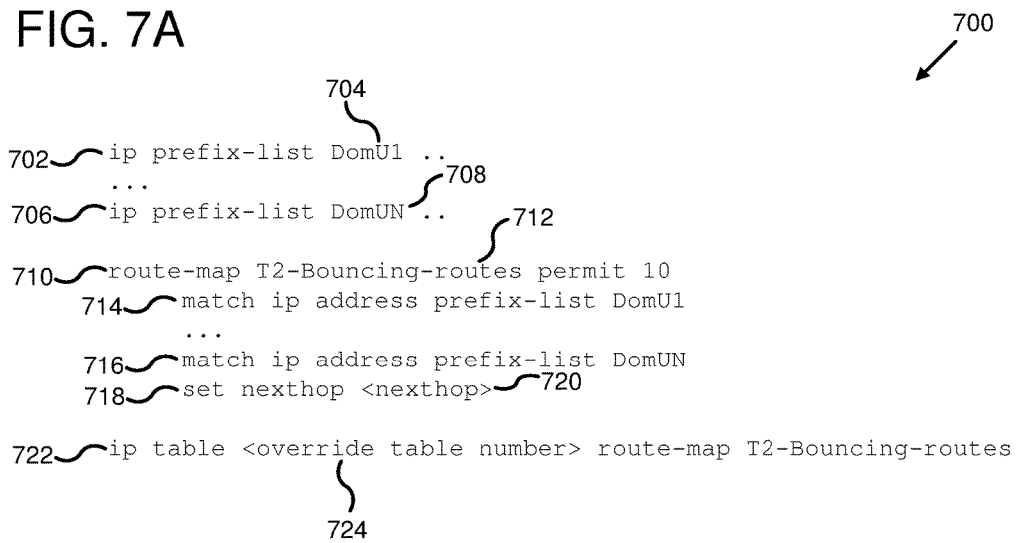
FIG. 7A is a diagram depicting an example template for use in generating configurations for routing communications between TOR routers through T2 routers.

FIG. 7A depicts an example configuration template 700 for creating an a so-called "override table" for bouncing data transmissions destined for specified domains to one or more T2 routers connected to a T1 router. When a packet arrives on a router interface that is configured to use the override table, the router looks up the destination IP address from the packet in the override table. If a match appears in the table, then the packet is forwarded based on the entry in the override table. If a match does not appear in the table, the destination for the packet is retrieved from a default table.

In the example template 700, IP prefix-list lines 702-706 define N prefix-lists DomU1 704-DomUN 708. A route-map line 710 defines a T2 bouncing route-map T2-Bouncing-routes 712. Match lines 714-716 specify that the route-map T2-Bouncing-routes 712 should be used for routing data packets destined for addresses in one or more of the domains defined by the prefix-lists 704-708. A set nexthop line 718 specifies a "nexthop" address 720 to which matching data transmissions should be routed. An ip table line 722 defines an override table, identified by an override table number 724, which is based on the route-map T2-Bouncing-routes 712.

Figure 7B:
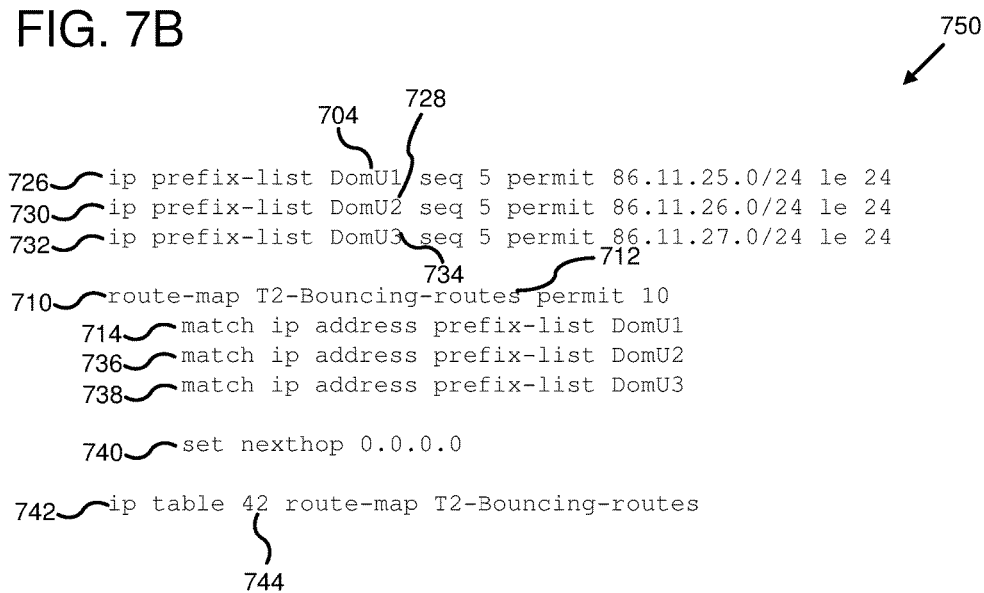
FIG. 7B is a diagram depicting an example configuration based on the example template depicted in FIG. 7A.

FIG. 7B depicts an example configuration 750 based on the example configuration template 700. IP prefix-list lines 726, 730, and 732 define prefix-lists DomU1 704, DomU2 728, and DomU3 734 for subnet masks associated with example TOR routers connected to a T1 router. Match ip lines 714, 736, and 738 specify that the route-map T2-Bounce-routes 712 should apply to packets with destinations that match one or more of the subnet masks specified in the prefix-lists DomU1 704, DomU2 728, and DomU3 734, respectively. A set nexthop line 740 specifies that matching packets should be routed to one or more T2 routers connected to the T1 router. The ip table line 742 specifies that an override table identified by an override table number 42 744 should be created based on the route-map T2-Bouncing-routes 712.

When the example configuration 750 is processed by the T1 router, the T1 router will create the override table 42 744 based on the route-map T2-Bouncing-routes 712. The override table can be applied to one or more interfaces of the T1 router. Once the override table is applied to an interface, packets received by the T1 router over the interface with destinations that match one or more of the specified subnet masks associated with the example TOR routers connected to the T1 router will be routed to one or more T2 routers connected to the T1 router.

Although in the examples of FIGS. 7A and 7B the prefix-lists refer to "DomU," suggesting that the devices referred to by these prefix-lists are running virtual machines, in various embodiments the prefix-lists can refer to various types of machines, including bare-metal and/or virtual machines. In the prefix-lists, "DomU" can be replaced by other terms, such as "subnet" or "prefix."

In at least one embodiment, the override table 42 744 can be applied to interfaces of the T1 router connected to the example TOR routers. In such an embodiment, packets received by the T1 router from one of the example TOR routers, and which are destined for the other of the example TOR routers, will be routed through the one or more T2 routers instead of being routed directly to the other TOR router.

In at least one embodiment, different alternative routing tables can be created for different interfaces of a T1 router. In such an embodiment, different routing decisions can be made for different TOR routers connected to different interfaces of the T1 router. This can be advantageous in scenarios where different TOR router-T1 router connections transport different types of data communications, some of which may benefit from "T2 bounce" routing and some of which may not.

For example, in at least one embodiment a network topology can be analyzed in real-time (e.g., by a performance monitor in communication with a configuration generation system) and an alternative routing table can be dynamically applied to interfaces that, based on the analysis of the topology, would benefit from "T2 bounce" routing. For example, for each TOR router-T1 router connection in the network topology, it can be determined whether there is a risk of congestion that could be prevented by using "T2 bounce" routing, and "T2 bounce" routing can be applied to T1 router interfaces connected to TOR routers that would benefit from it.

In a different or further embodiment, a T1 router can be configured to trigger "T2 bounce" routing when congestion is detected on one or more of the TOR router-T1 router connections. The T1 router can be configured to remove the "T2 bounce" routing once a condition creating the congestion subsides (e.g., a reduction on data traffic volume, completion of a bulk copy operation, etc.).

In a different or further embodiment, a T1 router can be configured to apply "T2 bounce" routing selectively to certain types of data traffic. For example, the T1 router can be configured to apply "T2 bounce" routing interfaces receiving data traffic where higher levels of latency are acceptable (such as large bulk copy operations) and apply ordinary routing to interfaces receiving data traffic that requires lower levels of latency (such as real-time streaming media).

Figure 8:
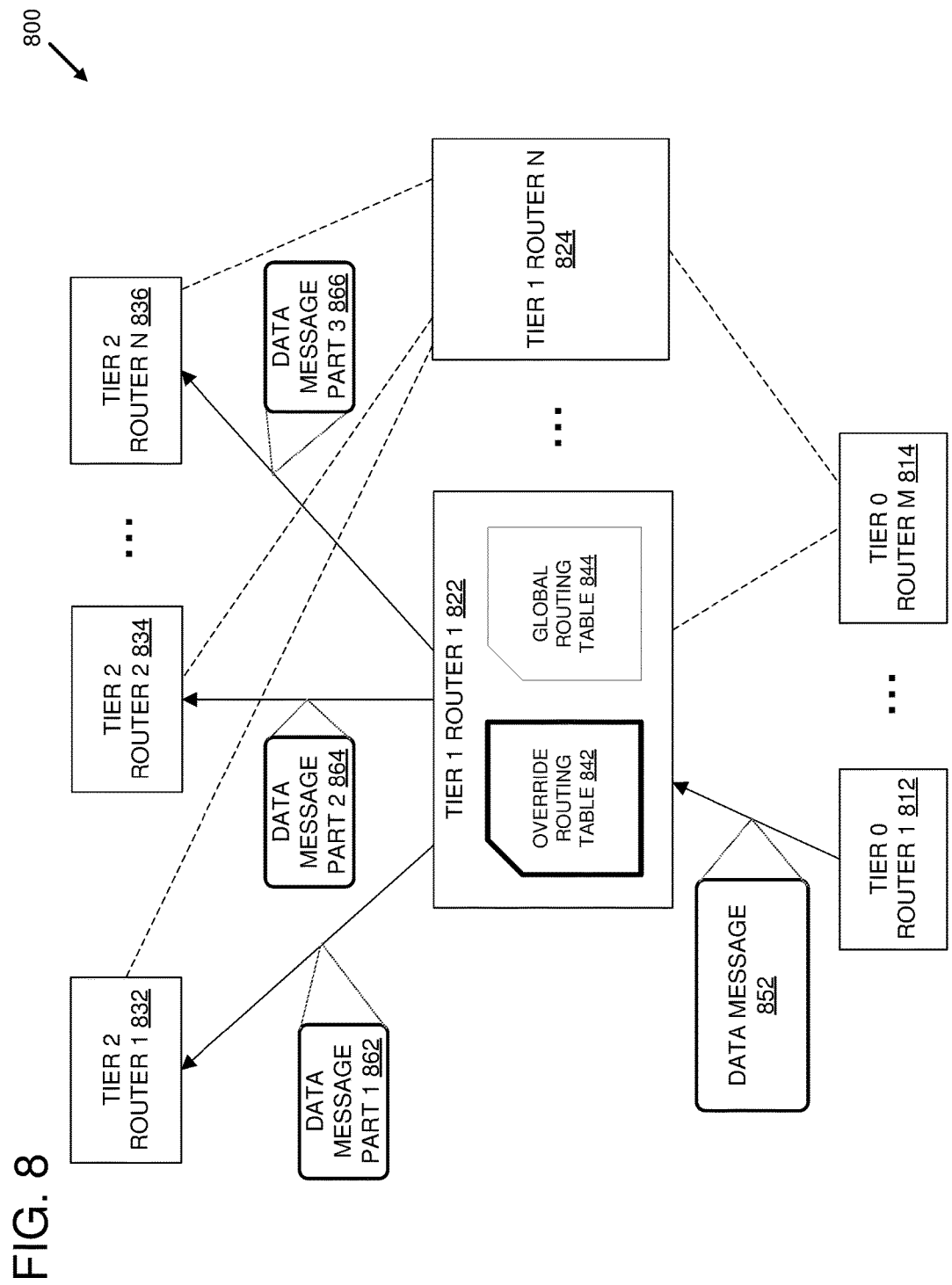
FIG. 8 is a system diagram showing an example system 800 configured to route a data message from one router in a lower tier of a network to another router in the lower tier of the network through routers in a higher tier of the network using an override routing table.

FIG. 8 is a system diagram showing an example system 800 configured to route a data message 852 from a router 812 in a lower tier of the network to another router in the lower tier of the network (such as 814) through one or more routers (832-836) in a higher tier of the network using an override routing table 842 in a router 822 in a middle tier of the network.

The tier 0 router one 812 is configured to transmitted data message 852 to the tier 1 router 822. The tier 1 router 822 comprises an override routing table 842 and a global routing table 844. The tier 1 router 822 is configured to use the override routing table 842 and/or the global routing table 844 to route data messages (e.g. 852) to one or more other routers in the network. In at least one embodiment, the override routing table 842 is used if one or more conditions are met, and the global routing table 844 is used when the one or more conditions are not met. For example, the override routing table 842 can be used to route a data message (such as data message 852) if a destination of the data message is one of the multiple tier 0 routers 812-814.

The tier 1 router 822 can be configured to use the override routing table 842 to route a received data message that is destined for a tier 0 router (e.g. 814) to one or more of the tier 2 routers 832-836 for re-routing to the tier 0 destination router. In at least one embodiment, data message 852 can comprise a sequence of data packets. In such an embodiment the data message 852 can be received by the tier 1 router 822 as a sequence of the data packets, although in at least some cases the data packets can be received by the tier 1 router 822 over multiple interfaces. The tier 1 router 822 can determine, using the override routing table 842, that the data message 852 is destined for another tier 0 router (e.g., 814). The tier 1 router 822 can use the override routing table 842 to identify one or more of the tier 2 routers 832-836 to transmit the data message 852 to for subsequent routing to the destination tier 0 router.

In an embodiment where the data message 852 comprises a sequence of data packets, the data packets can be transmitted independently to different tier 2 routers. For example, FIG. 8 depicts multiple data message parts 862-866 that are transmitted by the tier 1 router 822 to the tier 2 routers 832, 834, and 836, respectively. The data message parts 862-866 can each comprise one or more data packets of the data message 852. The tier 2 routers 832-836 can route the received data message parts on to the destination tier 0 router. Upon receipt of the multiple data message parts 862-866, the destination tier 0 router can reform the data message 852 from the multiple parts.

Optionally, the tier 2 routers 832-836 can be connected to additional tier 1 routers (e.g., 824). The tier 1 routers 822-824 can optionally be connected to multiple of the tier 0 routers 812-814. For example, tier 1 router 822 can be connected to the tier 0 router 812 and the tier 0 router 814. Similarly, the tier 1 router 824 can be connected to tier 0 router 814 and/or other tier 0 routers.

In an embodiment where the tier 1 router 824 is connected to the tier 2 routers 832-836, and the tier 1 routers 822 and 824 are both connected to the tier 0 router 814, the data message 852 can be transmitted to the tier 0 router 814 by the tier 1 router 822 and/or the tier 1 router 824. For example, the tier 1 router 822 can be configured to receive the data message 852 and to transmit all or part of the data message 852 to the tier 0 router 814. Additionally or alternatively, the tier 1 router 822 can transmit all or part of the data message 852 to one or more of the tier 2 routers 832-836 which, in turn, can transmit the all or part of the data message 852 to the tier 1 router 824. The tier 1 router 824 can then transmit the all or part of the data message 852 to the tier 0 router 814. In an embodiment where the data message 852 comprises a sequence of data packets, the data message parts 862-866 can be transmitted from the tier 2 routers 832-836, respectively, to the tier 1 router 822 and/or the tier 1 router 824. The tier 1 router 822 and/or the tier 1 router 824 can then transmit the received data message parts 862-866 to the tier 0 router 814.

Although only tier 1 router 822 is depicted as comprising an override routing table and/or global routing table, other routers in the network can also be configured to store one or more routing tables. For example, the tier 1 router 824 can be configured to store an override routing table and/or global routing table and to use its override routing table and/or global routing table to route data messages received from other routers in the network (such as the tier 0 router 814). In a different or further embodiment, the tier 2 routers 832-836 can be configured to store routing tables for routing received data transmissions to other routers within the network and, in some embodiments, routers outside of the depicted local network. In at least one embodiment, the tier 2 routers 832-836 store routing tables that contained the same or similar information as the global routing table 844 stored in the tier 1 router 822.

In at least one embodiment, the tier 0 routers 812-814 can be top-of-rack routers. In a different or further embodiment, the tier 1 router 822 can be configured to use the override routing table 842 to route data transmissions received over one or more interfaces of the tier 1 router 822 that are connected to one or more of the tier 0 routers 812-814. For example, the tier 0 router 812 can be a top-of-rack router connected to a downlink interface of the tier 1 router 822. The tier 1 router 822 can be configured to use the override routing table 842 when routing data transmissions (e.g. data message 852) received over one or more down link interfaces connected to the top-of-rack router 812.

In at least some embodiments where the override routing table 842 is used to route a data transmission when one or more conditions are met (e.g., a received data transmission is destined for a tier 0 router), if the one or more conditions are not met then the global routing table 844 can be used to route the data transmission instead.

Figure 9:
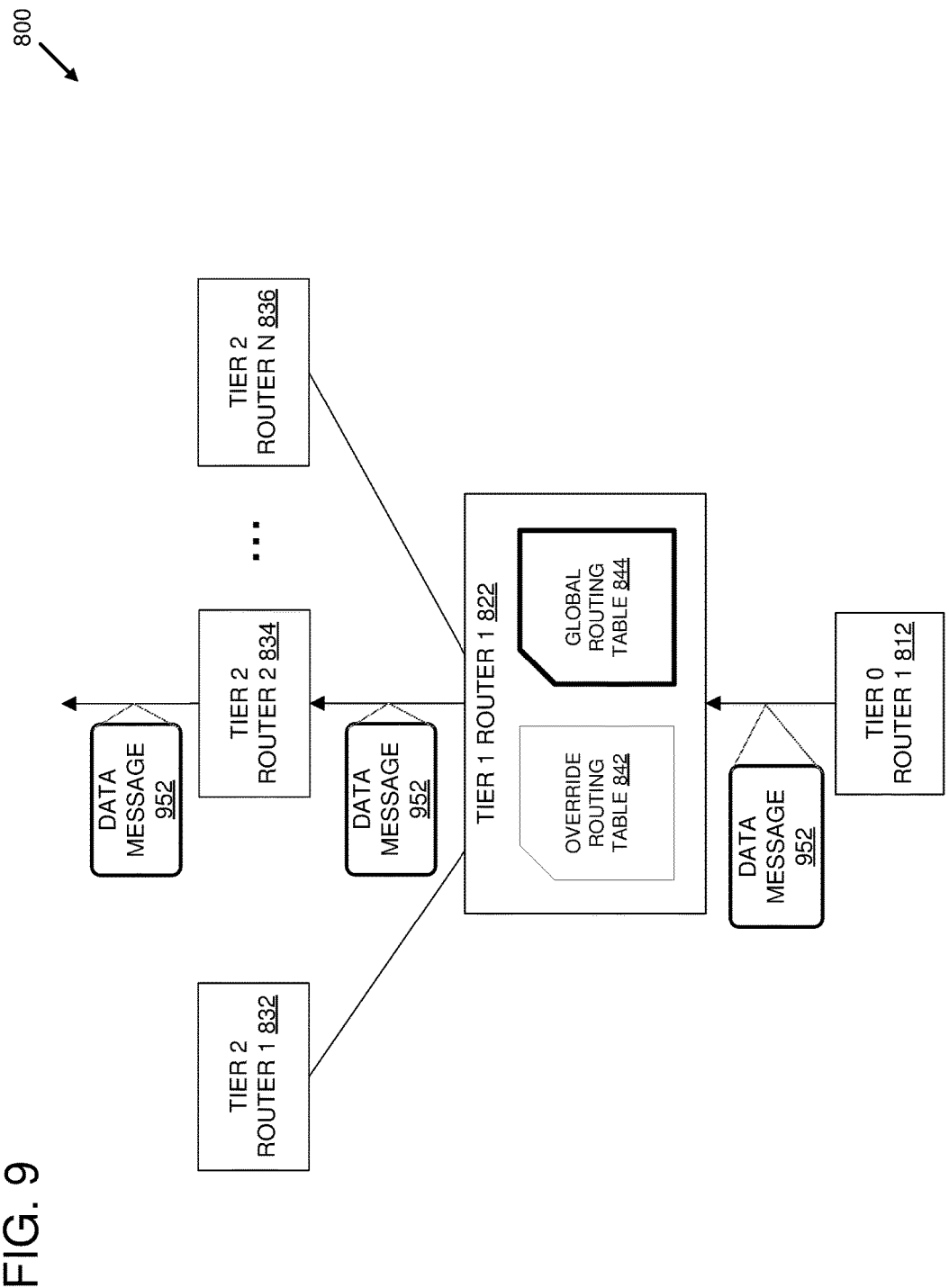
FIG. 9 is a system diagram showing the example system 800 configured to route a data message to a destination external to a network using a global routing table.

FIG. 9 is a system diagram showing the example system 800 wherein the tier 1 router 822 is configured to route a data message 952 using the global routing table 844. The tier 1 router 822 can be configured to use the global routing table 844 to route data transmissions (e.g., data message 952) in scenarios where the override routing table 842 is not applicable. For example, the data message 952 may be received over an interface of the tier 1 router 822 to which the override routing table 842 is not applied. Alternatively, the data message 952 may be received over an interface of the tier 1 router 822 to which the override routing table 842 is applied, but one or more conditions that must be satisfied for the override routing table 842 to apply may not be satisfied by the data message 952. For example, the override routing table 842 may apply only to data transmissions which are destined for one or more tier 0 routers in the network. In such a scenario, the tier 1 router 822 may determine that the data message 852 is not destined for a tier 0 router in the network and thus may use the global routing table 844 for routing the data message 952 to its destination instead of the override routing table 842.

Figure 10:
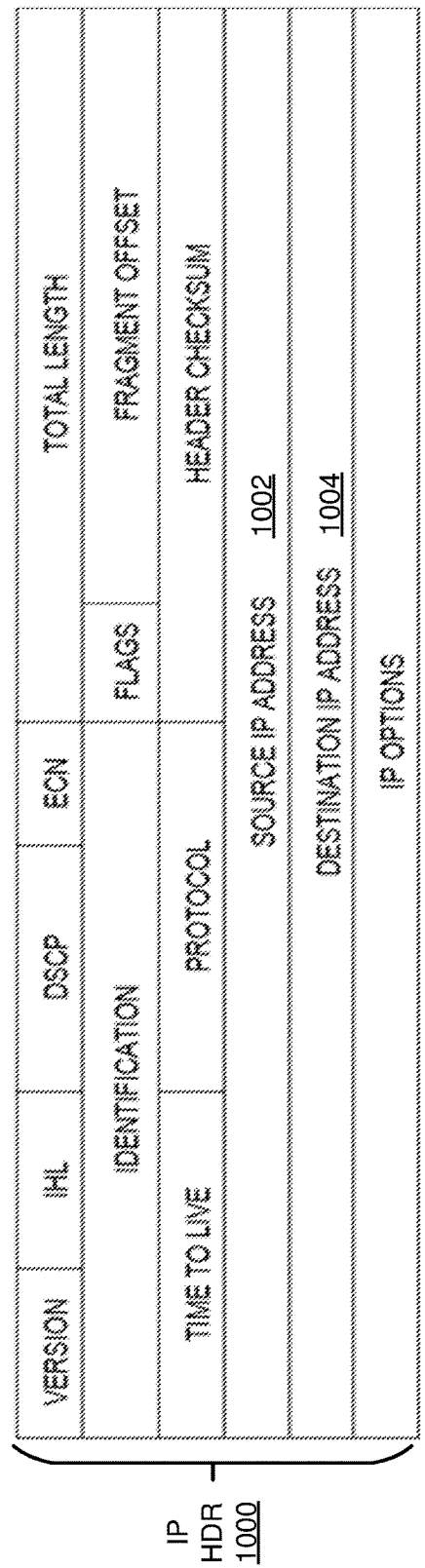
FIG. 10 is a diagram depicting an example packet header that can be used in selecting a routing table.

Turning briefly to FIG. 10, an example Internet Protocol (IP) datagram header 1000 is depicted. In embodiments where data transmissions are transmitted using the Internet Protocol Suite, a data transmission can comprise one or more data packets that comprise headers such as the IP header 1000. In such embodiments, a router from which a data packet originated can be determined using a source IP address field 1002 and a router (or other server) to which the data packet is destined can be determined using a destination IP address field 1004. In such an embodiment, a router in a multi-tier network (such as the tier 1 router 822 in FIGS. 8, 9, and 11) can be configured to evaluate an IP header of a received data message (such as data message 852 depicted in FIG. 8 or data message 952 depicted in FIG. 9) to determine a source router and/or a destination router of the received data message.

Returning to FIG. 9, the override routing table 842, in at least some embodiments, can be associated with a subnet mask. The subnet mask can be used to determine a destination of the data message 952 by attempting to match a destination field (such as a destination IP address field) of the data message 952 to the subnet mask. If the destination field of the data message 952 matches the subnet mask associated with the override routing table 842, the tier 1 router 822 can be configured to use the override routing table 842 to route the data message 952. However, if the destination field of the data message 952 does not match the subnet mask associated with the override routing table 842 then the tier 1 router 822 can be configured to use a default routing table (such as the global routing table 844) to route the data message 952 instead.

In FIG. 9, the tier 1 router 822 is depicted as using use the global routing table 844 to route the data message 952 to a destination outside of the network. The tier 1 router 822 is configured to identify one or more of the tier 2 routers 832-836, to which the data message 852 should be routed, based on a destination field (such as a packet destination header field) of the data message 952. In FIG. 9, the data message 952 is depicted as being transmitted from the tier 1 router 822 to the tier 2 router 834. Upon receiving the data message 952, the tier 2 router 834 determines a next-hop router for routing the data message 952 (e.g., by using a routing table stored in the tier 2 router 834 (not shown)). The tier 2 router 834 is configured to transmit the data message 952 to another router outside of the depicted local network (not shown).

In a particular embodiment, the tier 0 router 812 is a top-of-rack router and the tier 1 router 822 that is configured to use the override routing table 842 to route a data transmission (such as data message 952) received over one or more interfaces of the tier 1 router 822 connected to a top-of-rack router (e.g., tier 0 router 812) when a destination header of the data transmission contains an address of another top-of-rack router in the network. In a different or further embodiment, the tier 1 router 822 is configured to use a default routing table (such as the global routing table 844) to route the data transmission received over the one or more interfaces of the tier 1 router 822 when the destination header of the data transmission contains an address of a server outside the network.

Figure 11:
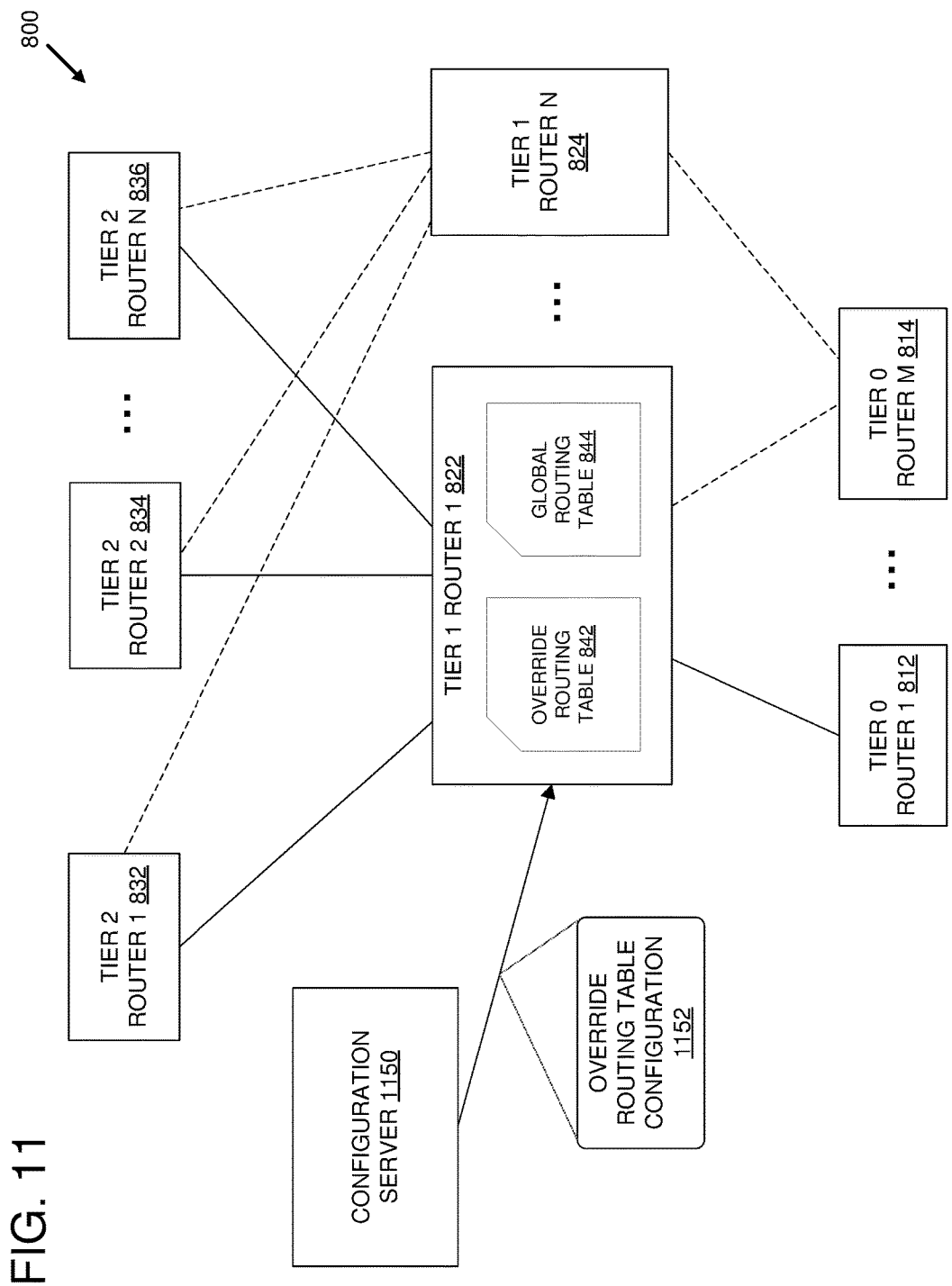
FIG. 11 is a system diagram showing the example system 800 comprising a configuration server configured to generate an override routing table configuration.

FIG. 11 is a system diagram showing the example system 800 further comprising a configuration server 1150. The configuration server 1150 is configured to generate an override routing table configuration 1152 and to transmit the override routing table configuration 1152 to the tier 1 router 822. The tier 1 router 822 is configured to receive the override routing table configuration 1152 and to process the override routing table configuration 1152 to generate the override routing table 842.

In at least one embodiment, the override routing table configuration 1152 specifies one or more subnet masks and/or address prefixes to identify routes to which the override routing table 842 should be applied. In a different or further embodiment, the override routing table configuration 1152 specifies one or more interfaces of the tier 1 router 822 to which the override routing table 842 should be applied. For example, based on the override routing table configuration 1152 the tier 1 router 822 can generate the override routing table 842 and apply the override routing table 842 to one or more interfaces of the tier 1 router 822 to which the tier 0 router 812 is connected. Additionally or alternatively, based on the override routing table configuration 1152 the tier 1 router 822 can associate the routing table 842 with one or more subnet masks and/or address prefixes that will match one or more of the tier 0 routers 812-814.

The configuration server 1150 can be configured to generate the override routing table configuration 1152 based on a topology of the network in system 800. For example, the configuration server 1150 can analyze the topology of the network to identify one or more tier 2 routers 832-836 to which the tier 1 router 822 is connected, and to identify one or more of the tier 0 routers 812-814 to which the tier 1 router 822 is connected. The configuration server 1150 can generate the override routing table configuration 1152 based on addresses of the identified tier 2 and tier 0 routers connected to the tier 1 router 822. In at least one embodiment, the override routing table configuration 1152 can specify one or more subnet masks and/or address prefixes that matches the addresses of the identified one or more tier 0 routers. In such an embodiment, the override routing table configuration 1152 can specify that the override routing table 842 should route data transmissions with source addresses that match one or more of the subnet masks and/or address prefixes to the one or more identified tier 2 routers.

In a different or further embodiment, based on the topology of the network, the configuration server 1150 can identify one or more interfaces of the tier 1 router 822 to which the identified tier 0 routers are connected and the override routing table configuration 1152 can specify that the override routing table 842 should be applied to the identified interfaces. In at least one such embodiment, the override routing table configuration 1152 can specify one or more subnet masks and/or address prefixes that should be matched by the T1 router 822 to destination addresses of data transmissions received over the one or more identified interfaces. In such an embodiment, the T1 router 822, upon receiving a data transmission over one of the identified interfaces, can attempt to match a destination address of the received data transmission to the one or more associated subnet masks and/or address prefixes. If the destination address of the received data transmission matches one or more of the subnet masks and/or address prefixes, the tier 1 router 822 can route the data transmission to one or more of the identified tier 2 routers using the override routing table 842. The override routing table configuration 1152 can specify addresses of the identified one or more tier 2 routers. The tier 1 router 822 can generate and/or update the override routing table 842 to include the specified addresses. If the destination address of the received data transmission does not match any of the subnet masks and/or address prefixes, the tier 1 router 822 can route the data transmission using the global routing table 844.

The configuration server 1150 can be configured to identify one or more other tier 1 routers (such as tier 1 router 824) and to generate additional override routing table configurations (not shown) for the other identified tier 1 routers. The configuration server 1150 can evaluate the network topology to identify one or more of the tier 0 routers 812-814 to which another tier 1 router is connected and to identify one or more of the tier 2 routers 832-836 to which the other tier 1 router is connected. The configuration server 1150 can generate a second configuration that, when processed by the other tier 1 router, will cause the other tier 1 router to generate an override routing table (not shown) that the other tier 1 router can use to forward data transmissions received by one of the identified tier 0 routers, and destined for another of the identified tier 0 routers, to one of the identified tier 2 routers. In at least one embodiment, the configuration server 1150 can generate such an override routing table configuration for each tier 1 router in the network in the example system 800.

Figure 12:
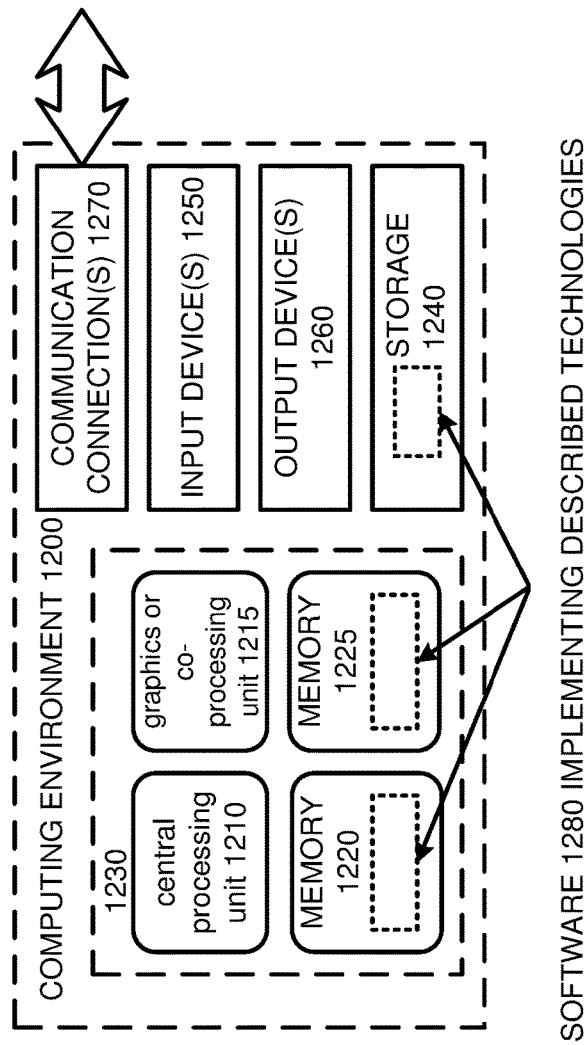
FIG. 12 depicts a generalized example of a suitable computing environment in which the described innovations may be implemented.

FIG. 12 depicts a generalized example of a suitable computing environment 1200 in which the described innovations may be implemented. The computing environment 1200 is not intended to suggest any limitation as to scope of use or functionality, as the innovations may be implemented in diverse general-purpose or special-purpose computing systems. For example, the computing environment 1200 can be any of a variety of computing devices (e.g., a router, switch, desktop computer, laptop computer, server computer, tablet computer, etc.).

With reference to FIG. 12, the computing environment 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing environment 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing environment 1200. The output device(s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A system, comprising:
multiple top-of-rack (TOR) routers, configured to:
transmit data packets to a router in a first tier of a network for routing among the TOR routers, and
receive data packets via the router in the first tier of the network; and
the router in the first tier of the network, comprising a default routing table and an override routing table, wherein the router in the first tier of the network is configured to:
receive a data packet from one of the TOR routers,
determine whether a destination header of the data packet contains an address of another one of the TOR routers, and responsive to the determining:
if the destination header of the data packet contains the address of the another of the TOR routers, use the override routing table to override a default behavior of the router in the first tier in the network of transmitting the data packets directly to the another one of the TOR routers, and instead transmit the data packet to a router in a second tier of the network for routing to the another one of the TOR routers, wherein the second tier is a higher tier in the network than the first tier; and
otherwise use the default routing table to route the data packet.

2. The system of claim 1, further comprising:
the router in the second tier of the network, configured to:
receive the data packets from the router in the first tier of the network, and
transmit the data packets back to the router in the first tier of the network for routing to the another one of the TOR routers.

3. The system of claim 1, wherein the router in the first tier of the network is further configured to:
determine that the data packet should be routed to another one of the multiple TOR routers using the override routing table; and
identify the router in the second tier of the network using the override routing table.

4. The system of claim 1, further comprising:
a configuration server configured to:
transmit an override routing table configuration to the router in the first tier; and
wherein the router in the first tier is further configured to:
receive the override routing table configuration from the configuration server, and generate the override routing table based on the received configuration.

5. The system of claim 1, wherein the router in the first tier is further configured to:
use the override routing table to route data packets received over one or more interfaces of the router in the first tier connected to the one of the TOR routers; and
use the default routing table to route data packets received over one or more other interfaces of the router in the first tier connected to the router in the second tier of the network.

6. A method, comprising:
receiving, at a particular router in an intermediate tier of a multi-tier network, a data transmission from a first router in a lower tier of the network, the first router being connected to the particular router;
determining that a destination of the data transmission is a second router in the lower tier of the network, the second router being connected to the particular router, wherein the determining that the destination of the data transmission is the second router in the lower tier of the network comprises matching the destination of the data transmission to a subnet mask associated with an override routing table;
responsive to the determining, overriding a default behavior of routing the data transmission directly to the second router in the lower tier via the connection between the second router and the particular router, and instead routing the data transmission to another router in a higher tier of the network for re-routing to the second router in the lower tier of the network, wherein the routing the data transmission to the another router in the higher tier of the network comprises looking up an address of the another router in the override routing table;
determining that a destination of a second data transmission does not match a subnet mask associated with the override routing table; and
routing the second data transmission using a default routing table.

7. The method of claim 6, further comprising:
re-receiving the data transmission at the particular router from the another router; and
routing the data transmission to the second router in the lower tier of the network.

8. The method of claim 6, wherein:
the data transmission comprises a data packet; and
determining that the destination of the data transmission is the second router in the lower tier of the network further comprises matching a value of a destination header of the data packet to the subnet mask associated with an override routing table.

9. The method of claim 6, further comprising:
receiving a configuration at the particular router, wherein the configuration specifies the subnet mask and the address of the another router; and
processing the configuration to generate the override routing table.

10. The method of claim 9, wherein the configuration specifies one or more interfaces of the router in the intermediate tier of the network to which the override routing table is applied.

11. The method of claim 6, wherein:
the first and second routers in the lower tier of the network are top-of-rack routers connected to rack-facing interfaces of the particular router.

12. The method of claim 6, further comprising:
receiving multiple data transmissions from the first router in the lower tier of the network destined for the second router in the lower tier of the network; and
routing the multiple data transmissions to different routers in the higher tier of the network for re-routing to the second router in the lower tier of the network.

13. A method, comprising:

identifying a router in a middle tier of a network topology;

identifying multiple routers in a lower tier of the network topology that are connected to the router in the middle tier;

identifying multiple routers in an upper tier of the network topology that are connected to the router in the middle tier;

generating a configuration that, when processed by the router in the middle tier of the network topology, causes the router in the middle tier of the network topology to generate an override routing table to override a default behavior of forwarding a data packet transmitted by one of the multiple routers in the lower tier, and destined for another of the routers in the lower tier, directly to the another of the routers in the lower tier, and instead forward the data packet, to one of the multiple routers in the upper tier of the network topology;

transmitting the configuration to the router in the middle tier of the network topology for processing;

processing the configuration by the router in the middle tier of the network topology, wherein the processing comprises:

generating the override routing table based on the configuration, and applying the generated override routing table to an interface of the router in the middle tier that is connected to one of the multiple routers in the lower tier of the network topology; and routing a data message received at the interface of the router in the middle tier of the network from the one of the multiple routers in the lower tier of the network, wherein the routing comprises:

analyzing the data message to determine whether a destination of the data message is one of the multiple routers in the lower tier of the network topology, if the destination of the data message is one of the multiple routers in the lower tier of the network topology, using the generated override routing table to identify one or more of the multiple routers in the higher tier of the network and routing the data message to the one of the identified routers, and otherwise using a global routing table to route the data message.

14. The method of claim 13, further comprising:

receiving a data message at the interface of the router in the middle tier of the network from the one of the multiple routers in the lower tier of the network topology;

based on the generated override routing table applied to the interface, overriding the default behavior of forwarding the data message directly to the another of the routers in the lower tier and instead forwarding the data message to the one of the multiple routers in the upper tier of the network topology.

15. The method of claim 13, further comprising:

identifying a second router in the middle tier of the network topology, wherein the second router in the middle tier is connected to one of the multiple routers in the lower tier of the network topology and is connected to one of the multiple routers in the upper tier of the topology;

generating a second configuration that, when processed by the second router in the middle tier of the network topology, causes the second router in the middle tier of the network topology to forward another data packet, transmitted by one of the multiple routers in the lower tier, and destined for the another of the routers in the lower tier, to the one of the multiple routers in the upper tier of the network topology; and transmitting the configuration to the second router in the middle tier of the network topology for processing.

16. The method of claim 13, wherein:

the configuration specifies the interface of the router in the middle tier to which the override routing table is applied.

17. The method of claim 13, wherein:

the configuration specifies a subnet mask to be associated with the override routing table.

* * * * *